Oct. 9, 1956  J. J. KOZAR  2,765,568
MECHANICAL FISHING LINE CASTER
Filed Jan. 5, 1955  2 Sheets-Sheet 1
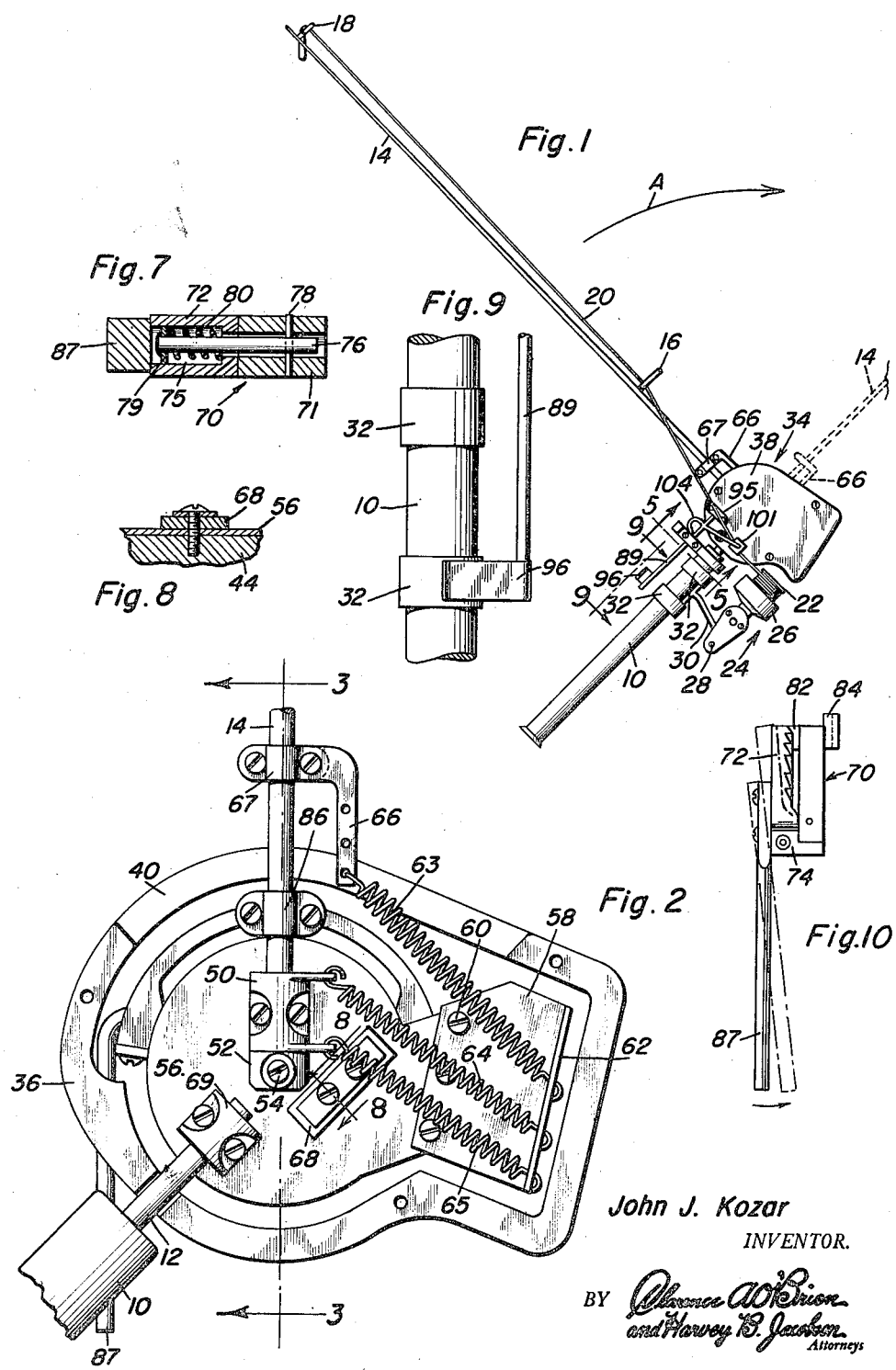
John J. Kozar
INVENTOR.

Oct. 9, 1956  J. J. KOZAR  2,765,568
MECHANICAL FISHING LINE CASTER
Filed Jan. 5, 1955  2 Sheets-Sheet 2

John J. Kozar
INVENTOR.

United States Patent Office 2,765,568
Patented Oct. 9, 1956

2,765,568

MECHANICAL FISHING LINE CASTER

John J. Kozar, Arnold, Pa.

Application January 5, 1955, Serial No. 480,007

5 Claims. (Cl. 43—19)

The present invention relates to a rod, spinning reel and fishing line construction for acceptable and practical use by anglers and has reference in particular to a novel mechanical caster for fishing line, that is, a unique structural device which is characterized, generally speaking, by a hand-grip, rod with eyes through which the fishing line passes and a specially designed contrivance which not only affords an operating connection between the rod and the hand-grip but serves when appropriately tripped to forcibly throw or cast the fishing line as accurately if not more so, than is usually accomplished by hand-casting.

In carrying out a preferred embodiment of the invention a conventional-type spinning reel is mounted on a short handle which is herein described as a hand-grip. A spring loaded rod whipping device is, in turn, mounted on the outer end of the hand-grip. The inner end of the rod extends through a slot in a marginal portion of the rod whipping device where it is operatively mounted in a unique manner to be hereinafter set forth. By providing manually releasable line gripping and clamping means on the stated device the line is properly held between the device and spinning reel in a manner which eliminates holding the line with one finger as is ordinarily required when casting with a spinning reel. Including other and necessary structural details an over-all caster is provided which has been found to be reliable and safe for boat fishing and fishing from a bank, wharf or elsewhere.

Another object of the invention is to provide a safe and reliable line caster which although the hand grip is conveniently and aptly held in the fisherman's hand, the construction and operation of the over-all device is such that there is no fear of throwing oneself off balance as often happens, especially to the inexperienced fisherman, when hand-casting.

A further object of the invention has to do with the incorporation in the over-all construction of the stated line clamping means which is such that it releases the line the moment the trigger means is released for tripping and bringing into play the rod whipping and operating device. This obviates not only the need to hold the line with the forefinger but offsets the likelihood of the user forgetting to release the line as so many times happens when the forefinger is depended upon for this seemingly simple fishing trick.

Briefly summarized, the preferred embodiment of the invention has to do with a novel line caster which comprises, in combination, a hand-grip, a catapult-like rod cocking and whipping device comprising a casing fixed to the outer end of said hand-grip, and casing having a marginal arcuate slot therein, a casting rod having an end portion passing through said slot into the casing and pivotally anchored in said casing, coil springs anchored in said casing and operatively connected with the pivoted end portion of said rod, a toothed rack fixed in said casing, a latch dog secured on said rod and operatively cooperable with said rack and teeth, a trip member carried by said rack, a rocker shaft, means for mounting the same in an operative position on said casing, said rocker shaft having a handily trippable finger-piece located and cooperable with said hand-grip, also having a trigger-finger operatively cooperable with said trip member, and a return and retaining spring having one end fixed to said casing and the other end operatively connected with said rocker shaft.

Other objects, features and advantages will become more readily apparent from the following description and the accompanying sheet of illustrative drawings.

In the drawings, wherein like numerals are employed to designate like parts throughout the views:

Figure 1 is an elevational view of a mechanical fishing line caster constructed in accordance with the principles of the present invention and showing the rod and line set in readiness for casting in which position the rod may be said to be cocked for operation;

Figure 2 is an enlarged fragmentary elevational view which is devoted primarily to the construction of the aforementioned catapult-like spring-loaded rod whipping device with the cover of the casing removed.

Figure 7 is an exaggerated cross section on the line 7—7 of Figure 6 looking in the direction of the arrows;

Figure 8 is an enlarged fragmentary section on the plane of the line 8—8 of Figure 2, looking in the direction of the arrows;

Figure 9 is a section on an enlarged scale taken approximately on the plane of the line 9—9 of Figure 1; and Figure 10 is an end elevation of the structure seen in Figure 6 observing the same in a direction from right to left and showing, in dotted lines, the mode of operation.

Figure 3:
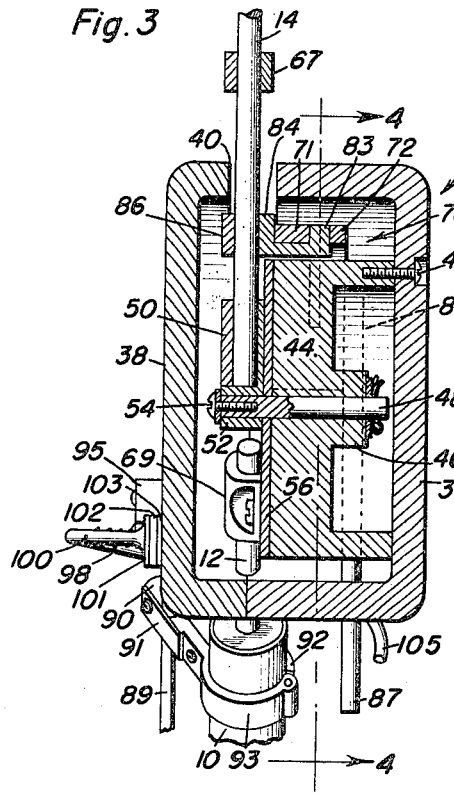
Figure 3 is a section on the vertical line 3—3 of Figure 2 looking in the direction of the arrows with certain parts appearing in elevation.
Figure 4:
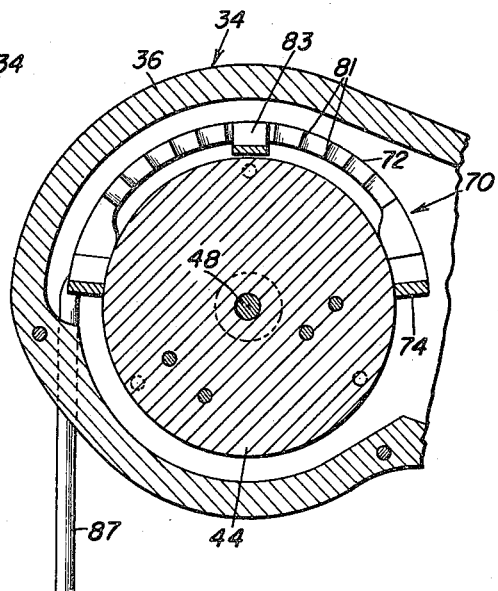
Figure 4 is a section on the vertical line 4—4 of Figure 3 looking in the direction of the arrows.

The general or over-all assemblage is perhaps best shown in Figure 1 wherein the handle, here treated as a hand-grip is denoted by the numeral 10. This is of any appropriate length and has an attaching shank 12 as seen in Figure 2. The rod or pole is denoted by the numeral 14 and it is provided with appropriate longitudinally spaced guide eyes 16 and 18 for the complemental free end portion 20 of the fishing line. The other end portion of the line is wound on the projectable and retractable spool 22 of the spinning reel 24. This comprises the usual shell or receiver 26 for the reel and crank and gearing means (not detailed) generally denoted at 28. The bracket 30 of the reel construction is connected to rings or the like 32—32 embracing the hand-grip in the manner shown.

The device constituting the operating connection between the hand-grip 10 and rod 14 is denoted, as an entity, by the numeral 34. It is characterized by a suitable aluminum or equivalent casing embodying a stationary section 36 and a cover section 38 appropriately bolted in place. A marginal or peripheral slot 40 serves to accommodate the adjacent cooperating inner end portion of the fishing rod 14, as perhaps best shown in Figure 3. As also seen here the casing section 36 is of cup-like form and has bolted or otherwise secured thereto as at 42 a circular block-like mount 44. The mount is centrally provided with a bearing 46 in which a pin or axle 48 is suitably secured. Socket means comprising the complemental parts 50 and 52 is fastened to the projecting end portion of the axle as at 54. The inner end of the rod 14 is fitted and suitably clamped or secured in this socket means. The socket means rotates on the axle so that the fishing rod may swing back and forth in an arcuate path from the full line position shown at the left in Figure 1 to the dotted line casting position. As seen in Figure 2, the wear plate 56 is provided with an extension carrying an angle bracket 58 secured in place at 60 and having a flange 62 to which the ends of the several coiled springs 63, 64 and 65 are connected. The left hand ends of springs 64 and 65 as shown in Figure 2 are connected to the aforementioned socket means 50 while the left hand end of the coil spring 63 is connected with an L-shaped bracket 66 secured by a clip 67 to the portion of the rod which extends through the slot 40 just outwardly of the periphery of the casing. The numeral 68 designates a cushion or stop block against which the socket means is swingable when the rod is swung for casting the line. This same wear plate has a clamping block 69 fastened thereto which serves to secure the shank 12 of the aforementioned hand-grip 10 in the casing 34 making the hand-grip and casing relatively fixed parts.

Figure 6:
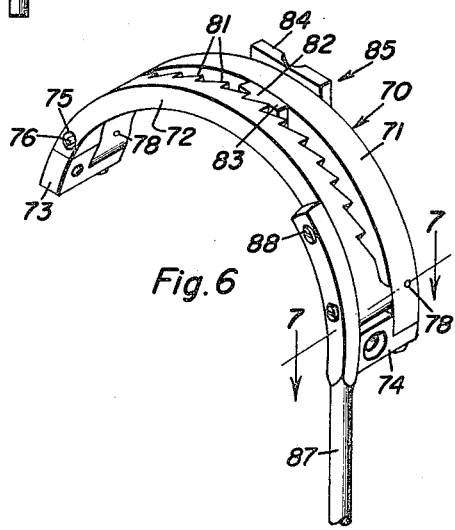
Figure 6 is a perspective view of the specially constructed rack and latch dog and complemental rack trip member.

Attention is directed at this time to the rack means which is fixedly mounted on the mount 44 and confined for operation within the protected limits of the casing. This rack means is referred to generally by the numeral 70 and it comprises a first arcuate bar member 71 which is appropriately fixed to the marginal portion of the mount and thus serves to accommodate the relatively movable second bar member 72. This is also arcuate and is in opposed parallelism and coplanar with the first bar member. These two bar members are connected at their respective opposite ends by assembling and connecting blocks or the like 73 and 74. With reference to Figure 7 it will be seen that at opposite ends the second bar member has recesses forming sockets 75 therein. There is a pin 76 secured at 77 to the first bar member 71 and this has a washer-equipped or suitably headed end 79 extending into the socket and serving to accommodate the tensioned coil spring 80. The coil spring surrounds the headed end of the pin and is confined in the socket. Its purpose is to keep the two bar members together with the rack teeth 81 in proper position to accommodate and cooperate with single tooth 82 on the latch dog 83. This latch dog is an integral part of a U-shaped member which slidably embraces the bar 71. There is a part 84 on this over-all latch dog 85 which serves to accommodate the complemental clip or clamp 86 seen in Figures 2 and 3 and this provides the means for operatively latching the fishing rod to the rack bar means 70. Normally the springs 80 press the respective end portions of two bars 71 and 72 together during which time the latch dog means 85 is held between said bars in a set position. This is essential when the fishing rod is in the cocked or ready-to-shoot position seen in Figure 1. Here the latch dog means 85 is at the left end (Fig. 1) of the rack and the rack teeth 81 engage the latch dog 82 and hold the rod in this set position. Special means is provided for properly tripping the spring returned rack bar 72. This means comprises a rigid trip member 87 having one end 88 fixed to the cooperating rack bar 72 in the manner shown in Figure 6. This member extends through an opening provided therefor in the periphery of the casing so that there is a free end portion accessible for actuation. This trip member is mechanically operated. Therefore, special trigger means is provided to attain this end.

Figure 5:
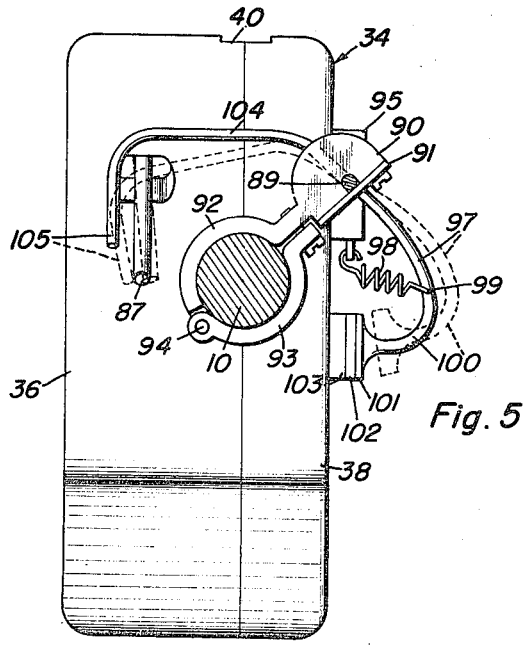
Figure 5 is an enlarged view taken on the approximate line 5—5 of Figure 1 looking in the direction of the arrows.

The preferred trigger means comprises a rocker shaft 89 the intermediate portion of which is secured between grips 90 and 91 (see Figure 5) carried by and forming parts of a clamp. The clamp comprises complemental sections 92 and 93 hinged together at 94 and embracing and secured to the hand-grip 10 in an obvious manner. One end portion of the rocker shaft is secured in an appropriate bearing block 95 (Figs. 1 and 5) mounted on the cover section 38 of the casing. This rocker shaft is provided on one side with a suitably curved lateral arm 97 and a return coil spring 98 is provided and is attached at one end as at 99 to the intermediate portion of said arm 97 and at its opposite end to the aforementioned bearing block 95, all as shown in Figure 5. The turned in curvate end 100 of this arm carries a head which provides a relatively movable jaw 101 having a fixed felt or equivalent face 102 which is movable toward a similar felt face 103 fixed on the cover section 38 and serving as a relatively fixed jaw. These two jaws 102 and 103 serve as holding means for that portion of the fishing line which ranges between the first eye 16 and the spinning reel 22, all as brought out in Figure 1. On the opposite side of the rocker shaft 89 there is a second lateral member 104 having a free end portion 105 which is arranged in close cooperating association with the trip rod or member 87 and the portions 104 and 105, form, in a collective sense, a trigger finger.

It will be clear that the spring assembly, that is, the several springs 63, 64 and 65 in Figure 2 keep the fishing rod under tension and the tendency thereof is to forcibly whip or throw the rod from the set position shown in full lines in Figure 1 to the line casting dotted line position shown in the same figure. By catching hold of the hand-grip 10 and rod 14 and pulling the rod in a direction opposite to the arrow *a* in Figure 1 the rod 14 may be set or cocked. It follows that the springs 63, 64 and 65 are stressed and the tooth 82 of the latch dog means 85 ratchets over the rack teeth 81 and the rod and latch dog is releasably held at one end of the rack. They stay in this position until the trip 87 is intentionally actuated. The fishing line is payed out from the reel 22 and is guided or threaded between the two jaws 102 and 103. It is then drawn or passed through the eyes 16 and 18 with the outer end baited and ready for casting in a now obvious manner. The trigger means serves to simultaneously open the line holding jaws 102 and 103 and also serves to oscillate the rocker shaft 89 to accomplish this result. This is done when one places the thumb against the finger-piece 96 and depresses the same in a manner obvious from a study of Figure 1. Both the arm 97 and trigger finger 104 and 105 now come simultaneously into play and the jaws 102 and 130, operated by arm 97, open and the free end 106 engages the trip member 87 with the result that the trip member 87 now moves in a direction, let us say, from left to right in Figures 6 and 10. This is permitted by the shifting over or opening of the relatively movable rack bar 72. Now then when the latch dog means 82 and 83 is released the springs 63, 64, 65 come into play and forcibly whip or throw the rod from left to right in the direction of the arrow A as seen in Figure 1. Sufficient force is thus brought into play to cause the fishing line to spool off of the spinning reel and to fly out, so as to speak, in customary casting fashion. The invention has been actually constructed and used and its use has shown that it does the desired casting job accurately and effectually.

Changes in shape, size, and rearrangement of elements and details may be resorted to within the spirit of the invention and without departing from the scope of the claims in actual practice, as is understood.

What is claimed as new is as follows:

1. A mechanical fishing line holding, reeling and casting device comprising, in combination, a hand-grip, a catapult-like rod cocking and whipping device comprising a casing fixed to the outer end of said hand-grip, said casing having a marginal arcuate slot therein, a casting rod having an end portion passing through said slot into the casing and pivotally anchored in said casing, coil springs anchored in said casing and operatively connected with the pivoted end portion of said rod, a toothed rack fixed in said casing, a rack dog secured on said rod and operatively cooperable with said rack and teeth for holding the rod in a cocked position against the action of said springs, a trip member carried by said rack, a rocker shaft and means for mounting the same in operative relation to said casing, said rocker shaft having a handily trippable finger-piece cooperable with said hand-grip, also having a trigger-finger operatively cooperable with said trip member and a return and retaining spring having one end fixed to said casing and the other end operatively connected with said rocker shaft, said rack comprising a first arcuate bar fixed in said casing, a second arcuate bar opposed to and paralleling said first bar and having rack teeth, pins fixed to said first bar and extending into sockets provided therefor in said second bar, and coil springs encircling their respective complemental pins, operatively mounted thereon and confined in their respective sockets so as to permit relative movement between said bars.

2. The structure defined in claim 1 and the combination therewith of a spinning reel mounted on said hand-grip, line eyes fixed on said rod, a fishing line wound on said reel and threaded for unreeling through said eyes, and manually releasable line clamping means mounted on said casing, said line being normally clamped against unreeling by said line clamping means.

3. A mechanical fishing line holding, reeling and casting device comprising, in combination, a hand-grip, a catapult-like rod cocking and whipping device comprising a casing fixed to the outer end of said hand-grip, said casing having a marginal arcuate slot therein, a casting rod having an end portion passing through said slot into the casing and pivotally anchored in said casing, coil springs anchored in said casing and operatively connected with the pivoted end portion of said rod, a toothed rack fixed in said casing, a latch dog secured on said rod and operatively cooperable with said rack and teeth for holding the rod in a cocked position against the action of said springs, a trip member carried by said rack, a rocker shaft and means for mounting the same in operative relation to said casing, said rocker shaft having a handily trippable finger-piece cooperable with said hand-grip, also having a trigger-finger operatively cooperable with said trip member, and a return and retaining spring having one end fixed to said casing and the other end operatively connected with said rocker shaft, said casing having a mount fixedly secured therein, said mount being provided with an axle, socket means secured to the inner end portion of said rod and mounted for rotation on said axle, said rack being mounted around a predetermined marginal edge portion of said mount and embodying arcuate bars one of which is provided with the stated rack teeth.

4. A mechanical fishing line casting device comprising, in combination, a hand-grip, a spring-loaded rod whipping device mounted on said hand-grip, a fishing rod pivotally and operatively mounted in said device and having line eyes thereon, a spinning reel mounted on said hand-grip, a fishing line carried by said reel and threaded through the eyes provided therefor on said rod, and manually releasable line gripping and clamping means operatively associated with said device and an adjacent portion of said hand-grip, said means serving to hold that portion of the line which ranges and spans the space between the spinning reel and the first line eye on said rod and being characterized by a stationary jaw fixed on said device, a movable jaw movable toward and from the stationary jaw, and a manually releasable spring-returned trigger assembly, said assembly embodying a rocker shaft and means mounting same for intended controllable oscillation, said shaft having a lateral complemental arm carrying said movable jaw, said device having a trip member, and a trigger-finger also carried by said rocker shaft and operatively cooperable with said trip member.

5. A mechanical fishing line holding, reeling and casting device comprising, in combination, a hand-grip, a catapult-like rod cocking and whipping device comprising a casing fixed to the outer end of said hand-grip, said casing having a marginal arcuate slot therein, a casting rod having an end portion passing through said slot into the casing and pivotally anchored in said casing, coil springs anchored in said casing and operatively connected with the pivoted end portion of said casting rod, a toothed rack mounted in said casing, a rack dog secured on said rod and operatively cooperable with said rack and teeth for holding the rod in a cocked position against the action of said springs, a trip member carried by said rack including a rocker shaft, means for mounting the same in operative relation to said casing, said rocker shaft having a handily trippable finger-piece cooperable with said hand-grip, also having a trigger-finger operatively cooperable with said trip member, a return and retaining spring having one end fixed to said casing and the other end operatively connected with said rocker shaft, a spinning reel mounted on said hand-grip, line eyes fixed on said casting rod, a fishing line wound on said reel and threaded for unreeling through said eyes, a first jaw fixed on said casing, an arm carried by said shaft, and a second jaw carried by said arm and cooperatively movable toward and from said first jaw, said line being normally clamped between said jaws.

References Cited in the file of this patent

UNITED STATES PATENTS 1,226,162    Attula _____ May 15, 1917

FOREIGN PATENTS 856,934    France _____ Aug. 16, 1940